United States Patent
Aso et al.

(10) Patent No.: US 8,464,515 B2
(45) Date of Patent: Jun. 18, 2013

(54) AMMONIA BURNING INTERNAL COMBUSTION ENGINE

(75) Inventors: Koji Aso, Susono (JP); Takahiko Fujiwara, Susono (JP); Hiroshi Tanaka, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 242 days.

(21) Appl. No.: 12/785,034

(22) Filed: May 21, 2010

(65) Prior Publication Data
US 2011/0283959 A1  Nov. 24, 2011

(51) Int. Cl.
*F01N 3/00* (2006.01)

(52) U.S. Cl.
USPC .................... 60/285; 60/286; 60/299; 60/303

(58) Field of Classification Search
USPC ............................ 60/285, 286, 299, 304, 320
See application file for complete search history.

(56) References Cited

U.S. PATENT DOCUMENTS

2007/0175208 A1* 8/2007 Bandl-Konrad et al. ....... 60/286
2008/0308056 A1   12/2008 Schiltz et al.

FOREIGN PATENT DOCUMENTS

JP          05332152 A  * 12/1993
JP          A-5-332152     12/1993

* cited by examiner

*Primary Examiner* — Thomas Denion
*Assistant Examiner* — Matthew T Largi
(74) *Attorney, Agent, or Firm* — Oliff & Berridge, PLC

(57) ABSTRACT

An ammonia burning internal combustion engine in which, in addition to ammonia, a reformed gas reformed at a reformer is fed into a combustion chamber. When a reforming ability of the reformer is less than a predetermined reforming ability, an ammonia ratio is increased to a ratio more than the ammonia ratio after completion of engine warmup set in advance in accordance with an operation state of the engine, and secondary air is fed from a secondary air feeding device into an engine exhaust passage upstream of an exhaust purification catalyst.

8 Claims, 8 Drawing Sheets

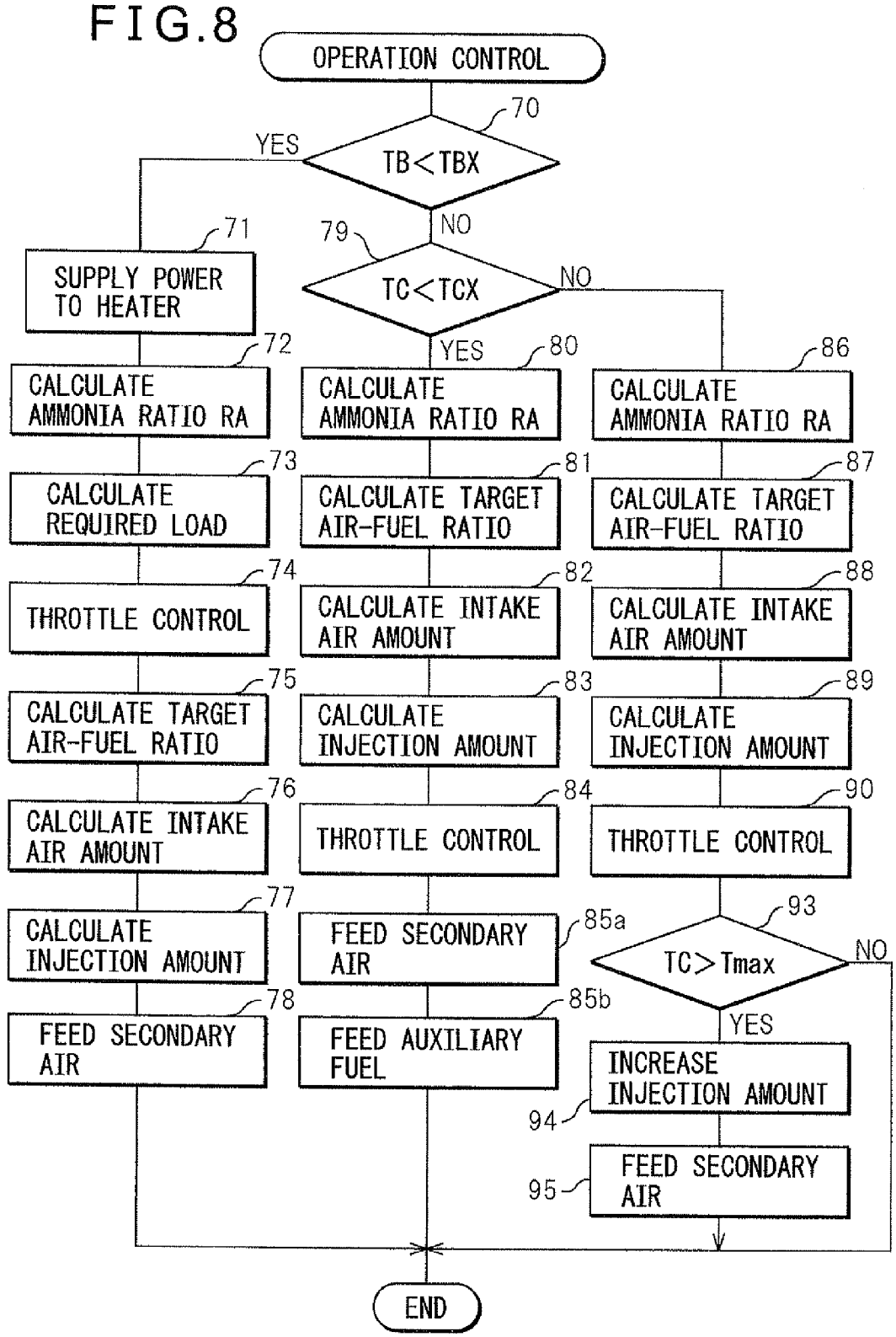

AMMONIA BURNING INTERNAL COMBUSTION ENGINE

BACKGROUND OF THE INVENTION

1. Field of the Invention

The present invention relates to an ammonia burning internal combustion engine.

2. Description of the Related Art

In an internal combustion engine, in the past, the fuel used has mainly been fossil fuels. However, in this case, burning such fuels produces $CO_2$, which causes global warming. On the other hand, burning ammonia does not produce $CO_2$ at all. Thus, there is known an internal combustion engine made so as to use ammonia as fuel and not produce $CO_2$ (for example, see Japanese Patent Publication (A) No. 5-332152).

However, ammonia is harder to burn compared with fossil fuels. Therefore, when using ammonia as fuel, some sort of measure is required for making the ammonia easier to burn. Thus, in the above-mentioned internal combustion engine, exhaust heat is utilized to reform the ammonia so as to produce reformed gas comprised of hydrogen and nitrogen, the hydrogen in the produced reformed gas is stored in a hydrogen storing alloy, and the hydrogen stored in the hydrogen storing alloy is fed together with the ammonia in a combustion chamber so as to enable easier combustion even when using ammonia as fuel.

SUMMARY OF THE INVENTION

However, when a hydrogen storage alloy is used, not only does the weight become heavy, but also the system for treating the hydrogen becomes complex since it is necessary to perform control for storing hydrogen in the hydrogen storage alloy and control for releasing the stored hydrogen from the hydrogen storage alloy. Accordingly, use of a hydrogen storage alloy is being avoided as much as possible in practice. In this regard, if a hydrogen storage alloy is not used, when the temperature of the reformer is low such as at the time of startup of the engine and accordingly the reforming ability of the reformer is low, the required sufficient hydrogen cannot be obtained. Therefore, some sort of measure has become necessary.

Therefore, in the present invention, there is provided an ammonia burning internal combustion engine using ammonia as fuel, comprising a reformer reforming ammonia and producing a reformed gas containing hydrogen, the reformed gas is fed into a combustion chamber in addition to the ammonia, an exhaust purification catalyst is arranged in an engine exhaust passage, a secondary air feeding device is arranged in the engine exhaust passage upstream of the exhaust purification catalyst, an ammonia ratio indicating a ratio of an amount of ammonia fed to a total amount of fuel fed after completion of engine warmup is set in advance in accordance with an operation state of the engine and, when a reforming ability of the reformer is less than a predetermined reforming ability, the ammonia ratio is increased over the ammonia ratio after completion of engine warmup set in advance in accordance with the operation state of the engine and a secondary air is fed from the secondary air feeding device into the engine exhaust passage upstream of the exhaust purification catalyst.

In the present invention, by increasing the ammonia ratio over the ammonia ratio after the completion of engine warmup set in advance in accordance with the running state of the engine if the reforming ability of the reformer is less than a reforming ability determined in advance, good combustion is obtained even in a case where sufficient hydrogen is not produced in the reformer. At this time, the unburned ammonia exhausted from the combustion chamber increases, but this unburned ammonia is oxidized by the secondary air fed from the secondary air feeding device.

BRIEF DESCRIPTION OF THE DRAWINGS

These and other objects and features of the present invention will become clearer from the following description of the preferred embodiments given with reference to the attached drawings, wherein:

FIG. 8 is a flow chart for operational control.

DESCRIPTION OF THE PREFERRED EMBODIMENTS

Figure 1:
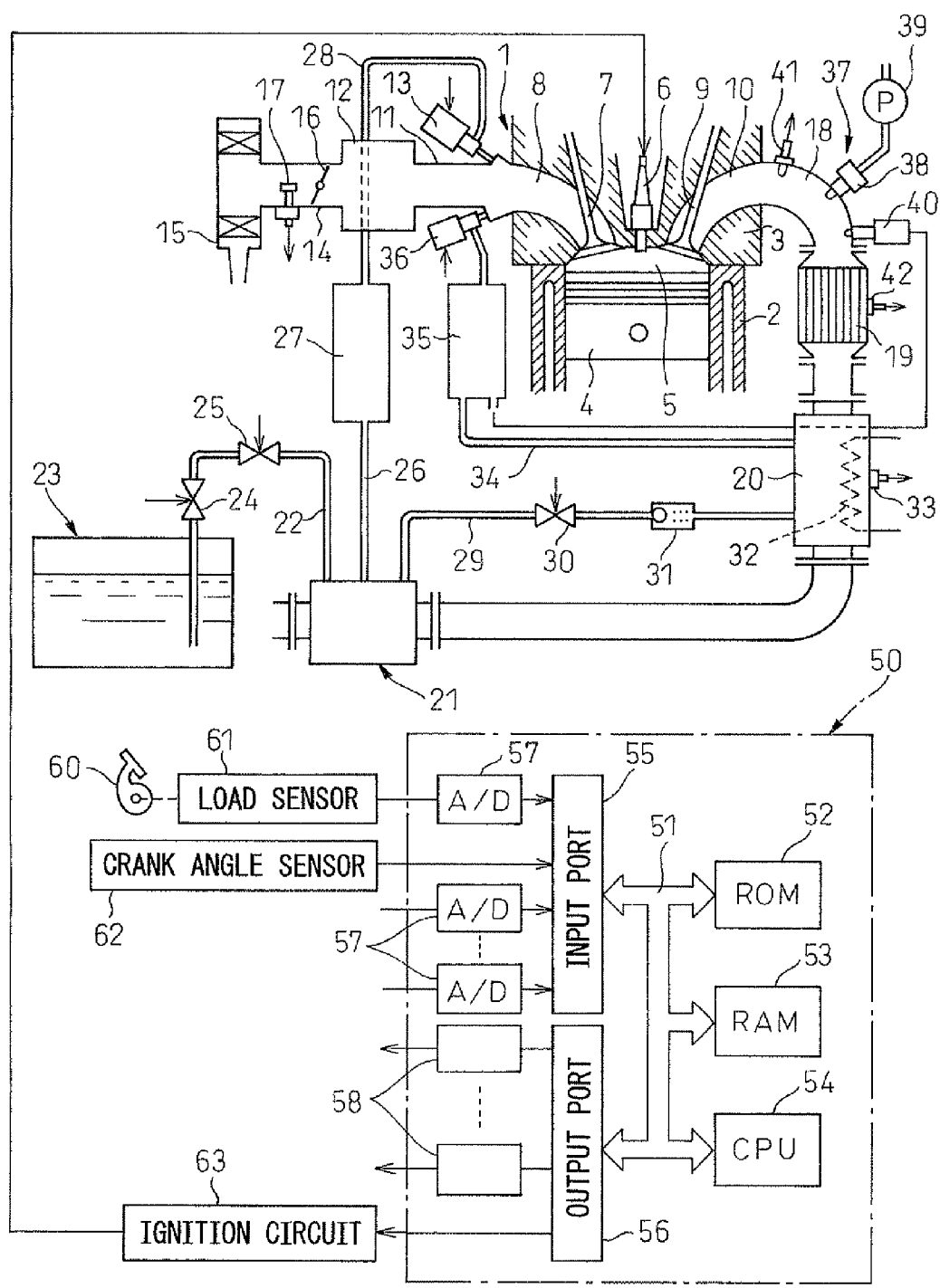
FIG. 1 is an overall view of an internal combustion engine.

Referring to FIG. 1, 1 indicates an internal combustion engine body, 2 a cylinder block, 3 a cylinder head, 4 a piston, 5 a combustion chamber, 6 a plasma jet spark plug which is arranged at the center of the top surface of the combustion chamber 5 and emits a plasma jet, 7 an intake valve, 8 an intake port, 9 an exhaust valve, and 10 an exhaust port. The intake port 8 is connected through an intake branch pipe 11 to a surge tank 12. In each intake branch pipe 11, an ammonia injector 13 for injecting gaseous ammonia toward the interior of each corresponding intake port 8 is arranged.

The surge tank 12 is connected through an intake duct 14 to an air cleaner 15, and the inside of the intake duct 14 is arranged with a throttle valve 16 driven by an actuator and an intake air amount detector 17 using a hot wire for example. On the other hand, the exhaust port 10 is connected through an exhaust manifold 18 to an exhaust purification catalyst 19 having an oxidation function. In the embodiment shown in FIG. 1, a reformer 20 and a vaporizer 21 are arranged in the exhaust passage downstream of this exhaust purification catalyst 19.

The vaporizer 21 is connected through an ammonia inflow pipe 22 to a fuel tank 23. Inside this ammonia inflow pipe 22, a shutoff valve 24 opening at the time of engine operation and closed when the engine stops and a pressure regulator 25 are arranged. The fuel tank 23 is filled with 0.8 MPa to 1.0 MPa or so high pressure liquid ammonia. Liquid ammonia in the fuel tank 23 is fed through the ammonia inflow pipe 22 into the vaporizer 21. In the embodiment shown in FIG. 1, the vaporizer 21 is formed so as to be heated by the exhaust gas. Therefore, the liquid ammonia fed into the vaporizer 21 is made to vaporize in the vaporizer 21.

The gaseous ammonia which is vaporized in the vaporizer 21 is fed through an ammonia outflow pipe 26 to an ammonia gas tank 27. The gaseous ammonia in the ammonia gas tank 27 is fed through a gaseous ammonia feed pipe 28 to the ammonia injector 13. The gaseous ammonia is injected from the ammonia injector 13 to the corresponding intake port 8.

On the other hand, the vaporizer 21 is connected to the reformer 20 through an ammonia outflow pipe 29. In this ammonia outflow pipe 29, a reformer control valve 30 which is open when the reformer 20 is performing a reform action and a check valve 31 enabling only flow from the vaporizer 21 toward the reformer 20 are arranged in series. When the reformer control valve 30 is open and the pressure in the reformer 20 becomes lower than the pressure in the vaporizer 21, the gaseous ammonia in the vaporizer 21 is fed into the reformer 20 through the ammonia outflow pipe 29.

In the embodiment shown in FIG. 1, the reformer 20 is formed so as to be heated by the exhaust gas. Further, this reformer 20 is provided with an electric heater 32. Further, in this reformer 20, a catalyst for promoting the reform action of ammonia is arranged. In this reformer 20, a temperature sensor 33 for detecting the temperature in the reformer 20 is arranged.

When the temperature in the reformer 20 becomes the temperature at which the reform action of ammonia is carried out or more, for example, several hundreds of degrees, the ammonia fed into the reformer 20 from the carburetor 21 is broken down to hydrogen and nitrogen ($2NH_3 \rightarrow N_2 + 3H_2$), that is, reformed. As a result, reformed gas containing hydrogen is produced in the reformer 20. When ammonia is broken down into hydrogen and nitrogen, the number of moles becomes double. With the addition of the thermal expansion of the reformed gas by heating action as well, the pressure in the reformer 20 rises. This raised pressure reformed gas is fed through a reformed gas feeding pipe 34 into a reformed gas storage tank 35.

As shown in FIG. 1, a reformed gas injector 36 for injecting the reformed gas toward the interior of each corresponding intake port 8 is arranged in each intake branch pipe 11. The reformed gas stored in the reformed gas storage tank 35 is fed to the reformed gas injector 36. From each reformed gas injector 36, the reformed gas is injected toward the interior of each corresponding intake port 8.

As shown in FIG. 1, in the engine exhaust passage upstream of the exhaust purification catalyst 19, that is, in the exhaust manifold 18, a secondary air feeding device 37 is arranged. This secondary air feeding device 37 is comprised of a secondary air feed valve 38 for feeding secondary air into the exhaust manifold 18 and an air pump 39 for feeding secondary air to this secondary air feed valve 38. Further, an auxiliary fuel feed valve 40 is arranged in the exhaust manifold 19. The reformed gas in the reformed gas storage tank 35 is fed to the auxiliary fuel feed valve 40 in the embodiment shown in FIG. 1. Further, an ammonia concentration sensor 41 for detecting the ammonia concentration in the exhaust gas exhausted from the combustion chamber 5 is arranged in the exhaust manifold 18, and a temperature sensor 42 for detecting the temperature of the exhaust purification catalyst 19 is attached to the exhaust purification catalyst 19.

An electronic control unit 50 is comprised of a digital computer provided with a ROM (read only memory) 52, RAM (random access memory) 53, CPU (microprocessor) 54, input port 55, and output port 56 all connected to each other through a bi-directional bus 51. The output signal of the intake air amount detector 17, the output signal of the ammonia concentration sensor 41, and the output signals of the temperature sensors 33 and 42 are input through corresponding AD converters 57 to the input port 55. An accelerator pedal 60 is connected to a load sensor 61 generating an output voltage proportional to the amount of depression of the accelerator pedal 60. The output voltage of the load sensor 61 is input through a corresponding AD converter 57 to the input port 55. Further, a crank angle sensor 62 generating an output pulse each time the crankshaft rotates by for example 30° is connected to the input port 55. On the other hand, the output port 56 is connected to an ignition circuit 63 of the plasma jet spark plug 6. Furthermore, the output port 56 is connected through a corresponding drive circuit 58 to the ammonia injector 13, the drive actuator of the throttle valve 16, shut-off valve 24, pressure regulator 25, reformer control valve 31, electric heater 32, reformed gas injector 36, secondary air feed valve 38, air pump 39, and auxiliary fuel feed valve 40.

Figure 2:
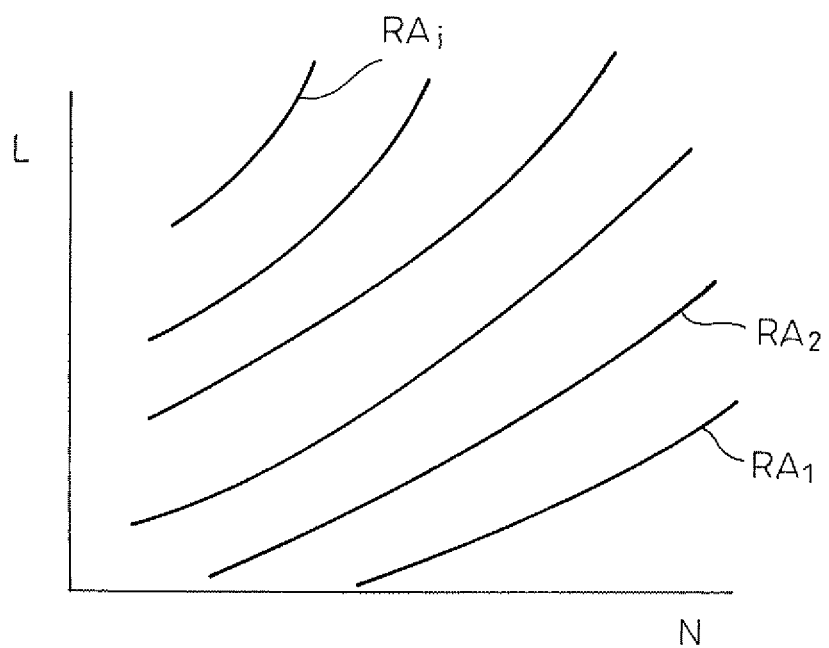
FIG. 2 is a view showing an ammonia ratio RA.

FIG. 2 shows a ammonia ratio RA (%) showing the ratio of the amount of ammonia fed to the total amount of fuel fed after completion of engine warmup. The solid lines $RA_1$, $RA_2$, ... $RAi$ in FIG. 2 show the equivalent ammonia ratio lines. From $RA_1$ to $RAi$, the ammonia ratio is gradually increased. Note that, in FIG. 2, the ordinate L indicates the engine load, while the abscissa N indicates the engine speed.

Ammonia is harder to burn compared with the reformed gas. Therefore, to make the mixed gas of ammonia and the reformed gas ignite and burn well in the combustion chamber 5, it is necessary to make the ammonia ratio smaller the lower the temperature of the mixed gas at the time of ignition. Therefore in this embodiment according to the present invention, as shown in FIG. 2, the more the engine load L falls, the more the ammonia ratio RA is made to fall, while the higher the engine speed N becomes, the more the basic ammonia ratio RA is made to fall.

That is, the lower the engine load L, the smaller the opening degree of the throttle valve 16 is made, so the compression end pressure in the combustion chamber 5 becomes lower the lower the engine load L. Therefore, the temperature of the mixed gas in the combustion chamber 5 at the end of the compression stroke in which ignition is performed becomes lower the lower the engine load L and therefore, as shown in FIG. 2, the ammonia ratio RA is made lower when the engine load L falls.

On the other hand, the ignition timing is made earlier the higher the engine speed N and therefore the pressure inside the combustion chamber 5 when the fuel is ignited becomes lower the higher the engine speed N. Therefore, the temperature of the mixed gas in the combustion chamber 5 when the fuel is ignited becomes lower the higher the engine speed N and therefore, as shown in FIG. 2, the ammonia ratio RA is made to fall if the engine speed N becomes higher. In this embodiment according to the present invention, the ammonia ratio RA shown in FIG. 2 is stored in advance in the ROM 52. After the completion of engine warmup, this stored ammonia ratio RA is used as the ammonia ratio.

Figure 3:
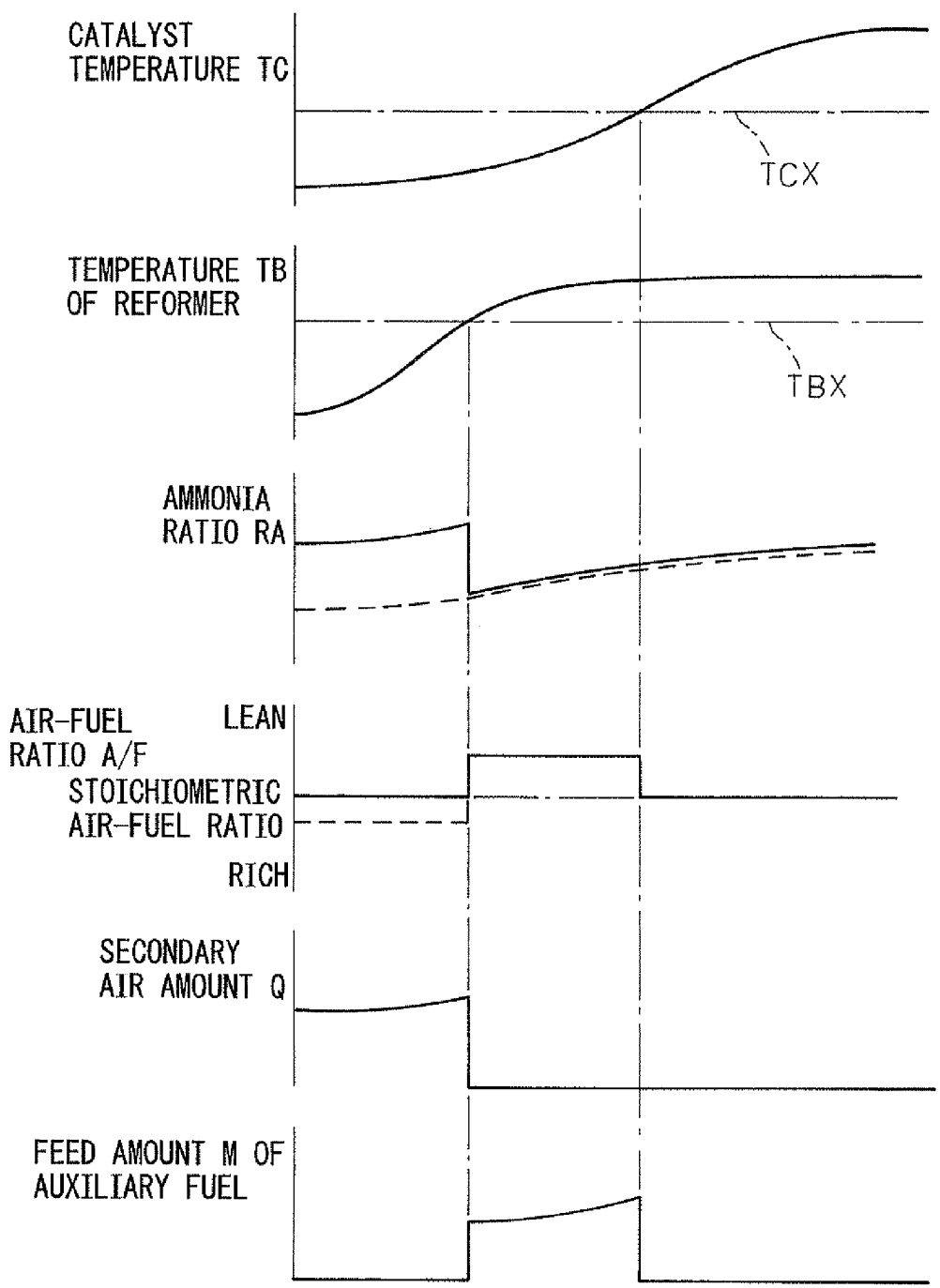
FIG. 3 is a timing chart showing a change of the ammonia ratio RA etc.

Next, a first embodiment of operational control according to the present invention will be explained with reference to the timing chart shown in FIG. 3. Note that, FIG. 3 shows changes of a catalyst temperature TC of the exhaust purification catalyst 19 immediately after engine startup, a temperature TB of the reformer 20, the ammonia ratio RA of the fuel fed into the combustion chamber 5, the air-fuel ratio A/F in the combustion chamber 5, an amount Q of secondary air fed from the secondary air feed valve 38, and the feed amount M of auxiliary fuel fed from the auxiliary fuel feed valve 40, that is, the reformed gas. Note that, in FIG. 3, TCX indicates the activation temperature of the exhaust purification catalyst 19. Further, in the present invention, it is determined whether the reformer 20 has a predetermined reforming ability, that is, for example, a reforming ability with which the reformer 2 can produce hydrogen in a predetermined amount. In the embodiment according to the present invention, at the time when the temperature TB of the reformer 20 exceeds a predetermined set temperature TBX shown in FIG. 3, it is determined that the reformer 20 has the predetermined reforming ability.

Immediately after engine startup, as shown in FIG. 3, the catalyst temperature TC is low, and the temperature TB of the reformer 20 is low as well. Namely, the reforming ability of the reformer 20 is less than the predetermined reforming ability immediately after engine startup. Accordingly, a sufficient amount of hydrogen cannot be produced in the reformer 20. At this time, the reformed gas stored in the reformed gas storage tank 35 is injected from the reformed gas injector 36. However, there is a limit to the amount of the reformed gas which can be stored in the reformed gas storage tank 35. Namely, the reformed gas becomes insufficient immediately after engine startup.

On the other hand, as will be understood from FIG. 2, the ammonia ratio RA by which good combustion is obtained is determined from the operation state of the engine, that is, the engine load L and the engine speed N. However, even when the ammonia ratio is made the ammonia ratio RA determined from the operation state of the engine, if the reformed gas is insufficient, the required reformed gas amount cannot be secured, therefore it becomes impossible to perform good combustion.

Therefore, in the present invention, when the reforming ability of the reformer 20 is less than the predetermined reforming ability, the ammonia ratio is increased to a ratio more than the ammonia ratio RA after the completion of engine warmup indicated by a broken line in FIG. 3 and set in advance in accordance with the operation state of the engine, that is, the ammonia ratio is increased to a ratio more than the ammonia ratio RA shown in the map of FIG. 2. When the ammonia ratio RA is increased, the required reformed gas amount decreases, thus the required reformed gas amount can be sufficiently secured.

On the other hand, as will be understood from FIG. 2, in order to obtain good combustion when the ammonia ratio RA increases, it is necessary to make the engine load L higher. Therefore, in the embodiment according to the present invention, the engine load L is increased when the ammonia ratio RA is increased. This increase of the engine load L is made by increasing the opening degree of the throttle valve 16. Further, in the embodiment according to the present invention, the air-fuel ratio A/F is made the stoichiometric air-fuel ratio indicated by a solid line in FIG. 3 when the ammonia ratio RA is increased in this way.

On the other hand, when the reforming ability of the reformer 20 is less than the predetermined reforming ability, the air-fuel ratio may be made rich as indicated by a broken line in FIG. 3. At this time, the ammonia feed amount is increased. Further, at this time, the engine load L is increased.

On the other hand, when the ammonia ratio RA is increased in this way, the amount of the unburned ammonia exhausted from the combustion chamber 5 increases. Therefore, in the present invention, when the ammonia ratio RA is increased in order to oxidize this unburned ammonia, the secondary air is fed into the engine exhaust passage upstream of the exhaust purification catalyst 19 from the secondary air feeding device 37. At this time, the exhaust purification catalyst 19 is not activated, but the unburned ammonia is oxidized relatively well when the secondary air is fed even when the exhaust purification catalyst 19 is not activated.

On the other hand, in this first embodiment, when the reforming ability of the reformer 20 becomes the predetermined reforming ability or more, until the exhaust purification catalyst 19 is activated, that is, until the temperature TC of the exhaust purification catalyst 19 exceeds the activation temperature TCX, the air-fuel ratio A/F is made lean and the auxiliary fuel is fed from the auxiliary fuel feed valve 40 into the engine exhaust passage upstream of the exhaust purification catalyst 19. Namely, at this time, the exhaust gas contains excess oxygen, so the fed auxiliary fuel is oxidized on the exhaust purification catalyst 19, and the temperature of the exhaust purification catalyst 19 is raised by the heat of oxidation reaction at this time.

Figure 4:
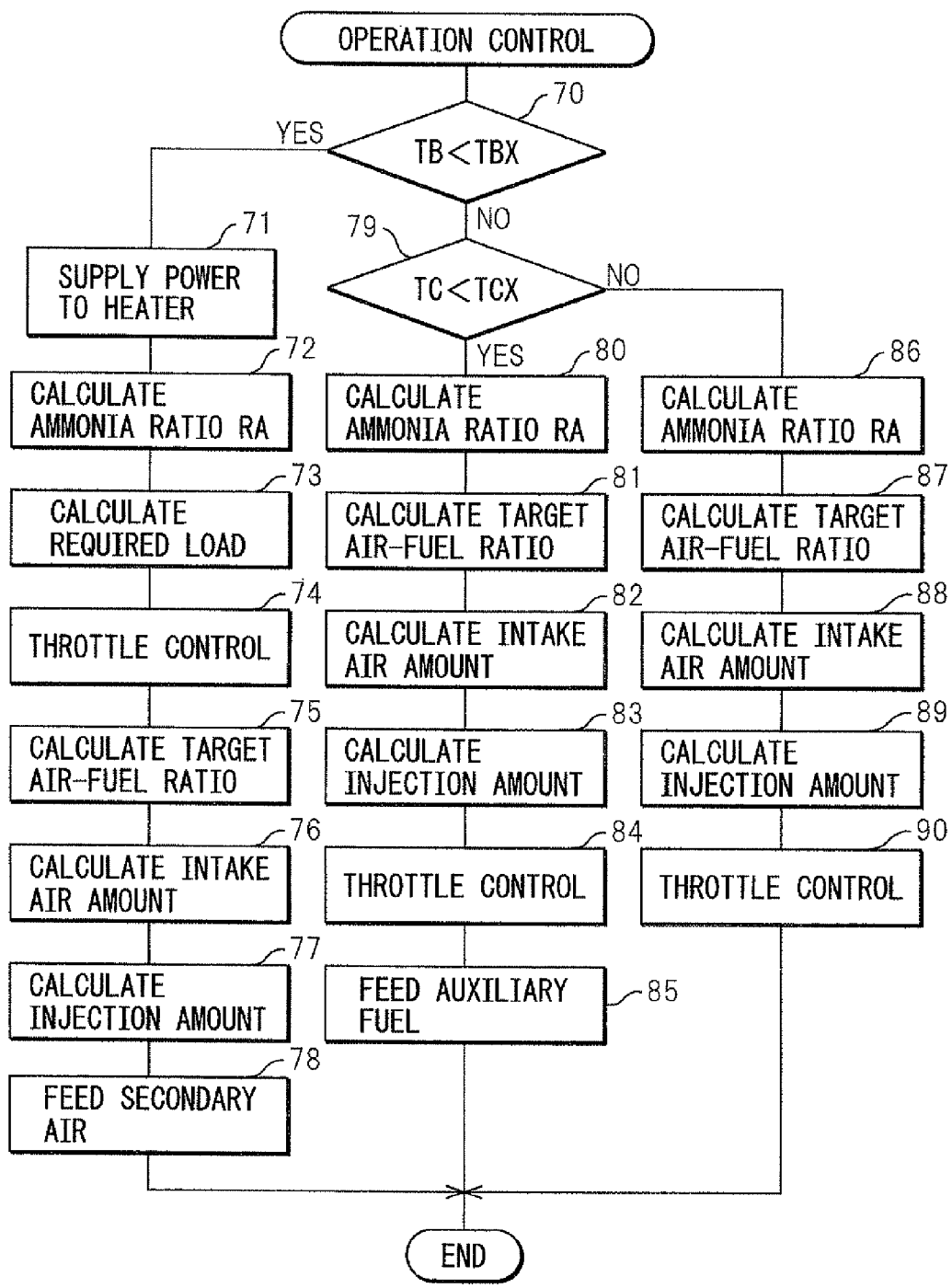
FIG. 4 is a flow chart for operational control.

FIG. 4 shows an operational control routine for executing the first embodiment shown in FIG. 3. Referring to FIG. 4, first of all, at step 70 it is determined whether the temperature TB of the reformer 20 is lower than the predetermined set temperature TBX. When TB<TBX, the routine proceeds to step 71 where electric power is supplied to the electric heater 32 of the reformer 20 and thereby the heating action of the reformer 20 is commenced. Next, at step 72, the ammonia ratio RA is calculated. This ammonia ratio RA is made a value larger than the ammonia ratio after the completion of engine warmup shown in FIG. 2.

Next, at step 73, a required load with which good combustion is obtained is calculated with the use of the calculated ammonia ratio RA. Next, at step 74, the opening degree of the throttle valve 16 is controlled so that the engine load satisfies this required load. At this time, the opening degree of the throttle valve 16 becomes large, and the engine load becomes large as well. Next, at step 75, the target air-fuel ratio is calculated. This target air-fuel ratio is the stoichiometric air-fuel ratio or rich air-fuel ratio. Next, at step 76, the intake air amount is calculated from the output signal of the intake air amount detector 17.

Next, at step 77, the amount of ammonia to be injected from the ammonia injector 13 and the amount of the reformed gas to be injected from the reformed gas injector 36 are calculated based on the calculated ammonia ratio RA, target air-fuel ratio, and intake air amount, and the ammonia and reformed gas are injected from the ammonia injector 13 and reformed gas injector 36 based on these calculated values. Next, at step 78, the secondary air is fed from the secondary air feed valve 38.

On the other hand, when it is determined at step 70 that TB≧TBX, that is, when the reformer 20 commences production of hydrogen, the routine proceeds to step 79. At this time, supply of electric power to the electric heater 32 is suspended. At step 79, it is determined whether the catalyst temperature TC is lower than the activation temperature TCX. When TC<TCX, the routine proceeds to step 80 where the ammonia ratio RA is calculated from the map shown in FIG. 2. Next, at step 81, the target air-fuel ratio is calculated. At this time, the target air-fuel ratio is set to the lean air-fuel ratio. Next, at step 82, the intake air amount is calculated from the output signal of the intake air amount detector 17.

Next, at step 83, the amount of ammonia to be injected from the ammonia injector 13 and the amount of the reformed gas to be injected from the reformed gas injector 36 are calculated based on the calculated ammonia ratio RA, target air-fuel ratio, and intake air amount, and the ammonia and reformed gas are injected from the ammonia injector 13 and reformed gas injector 36 based on these calculated values. Next, at step 84, the opening degree of the throttle valve 16 is controlled to the throttle valve opening degree in accordance with the engine load. Next, at step 85, the auxiliary fuel is fed from the auxiliary fuel feed valve 40.

On the other hand, when it is determined at step 79 that TC≧TCX, that is, when the exhaust purification catalyst 19 is activated, the routine proceeds to step 86 where the ammonia ratio RA is calculated from the map shown in FIG. 2. Next, at step 87, the target air-fuel ratio is calculated. At this time, the target air-fuel ratio is set to the stoichiometric air-fuel ratio. Next, at step 88, the intake air amount is calculated from the output signal of the intake air amount detector 17.

Next, at step 89, the amount of ammonia to be injected from the ammonia injector 13 and the amount of the reformed gas to be injected from the reformed gas injector 36 are calculated based on the calculated ammonia ratio RA, target air-fuel ratio, and intake air amount, and the ammonia and reformed gas are injected from the ammonia injector 13 and reformed gas injector 36 based on these calculated values. Next, at step 90, the opening degree of the throttle valve 16 is controlled to the throttle valve opening degree in accordance with the engine load.

Figure 5:
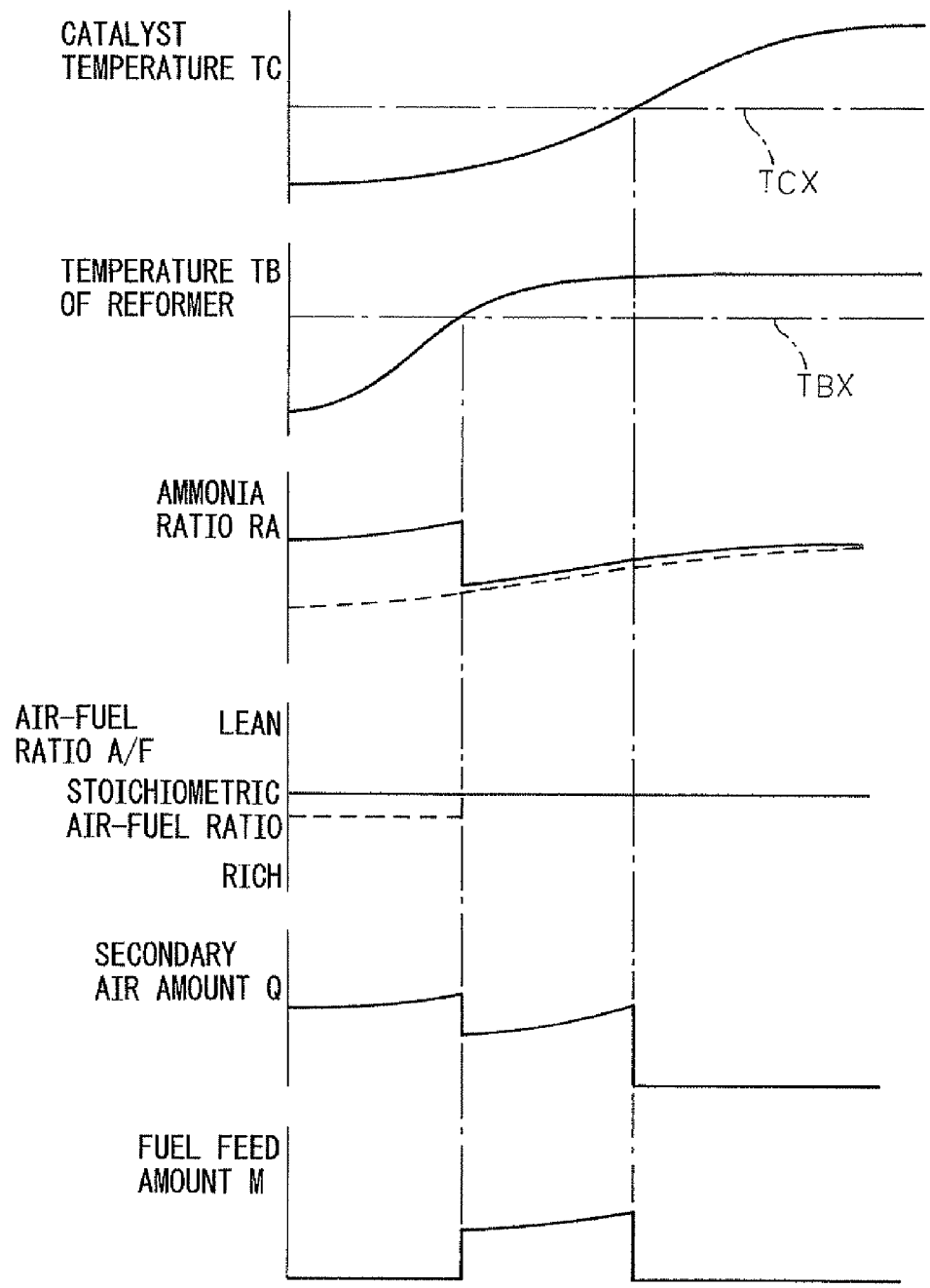
FIG. 5 is a timing chart showing a change of the ammonia ratio RA etc.

FIG. 5 shows the second embodiment. In this second embodiment, the difference from the first embodiment shown in FIG. 3 resides in that the air-fuel ratio A/F is made the stoichiometric air-fuel ratio and the secondary air is fed for a period from when TB becomes equal to or larger than TBX to when TC becomes equal to or larger than TCX. Namely, in this second embodiment, when the reforming ability of the reformer 20 becomes the predetermined reforming ability or more, the secondary air and auxiliary fuel are fed into the engine exhaust passage upstream of the exhaust purification catalyst 19 until the exhaust purification catalyst 19 is activated.

Figure 6:
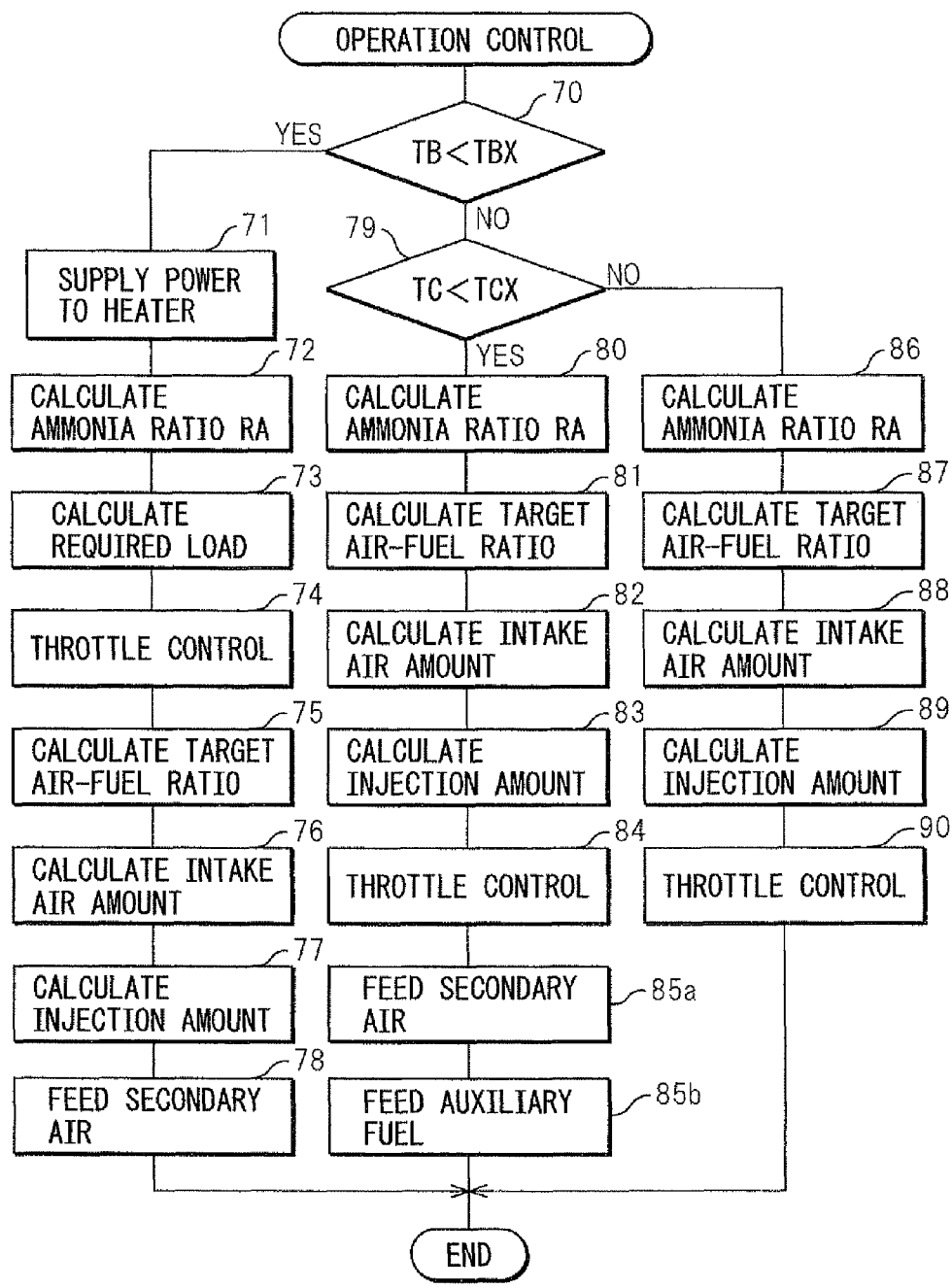
FIG. 6 is a flow chart for operational control.

FIG. 6 shows an operational control routine for executing this second embodiment. The difference between this operational control routine shown in FIG. 6 and the operational control routine shown in FIG. 4 resides in only step 81 and step 85 shown in FIG. 4. Accordingly, an explanation will be given of only these different portions.

Namely, at step 81 of FIG. 4, the target air-fuel ratio is set to a lean air-fuel ratio. In contrast, at step 81 of FIG. 6, the target air-fuel ratio is set to the stoichiometric air-fuel ratio. On the other hand, in FIG. 6, two steps 85a and 85b are provided in place of step 85 in FIG. 4. In this case, at step 85a, the secondary air is fed from the secondary air feed valve 38, and at step 85b, the auxiliary fuel is fed from the auxiliary fuel feed valve 40.

Next, a third embodiment will be explained. In this third embodiment, the ammonia concentration in the exhaust gas discharged from the combustion chamber 5 is detected by the ammonia concentration sensor 41. When this ammonia concentration exceeds a predetermined allowable concentration, the secondary air is fed into the engine exhaust passage. Namely, in this third embodiment, even after the exhaust purification catalyst 19 is activated, the secondary air is fed in order to oxidize the unburned ammonia.

Figure 7:
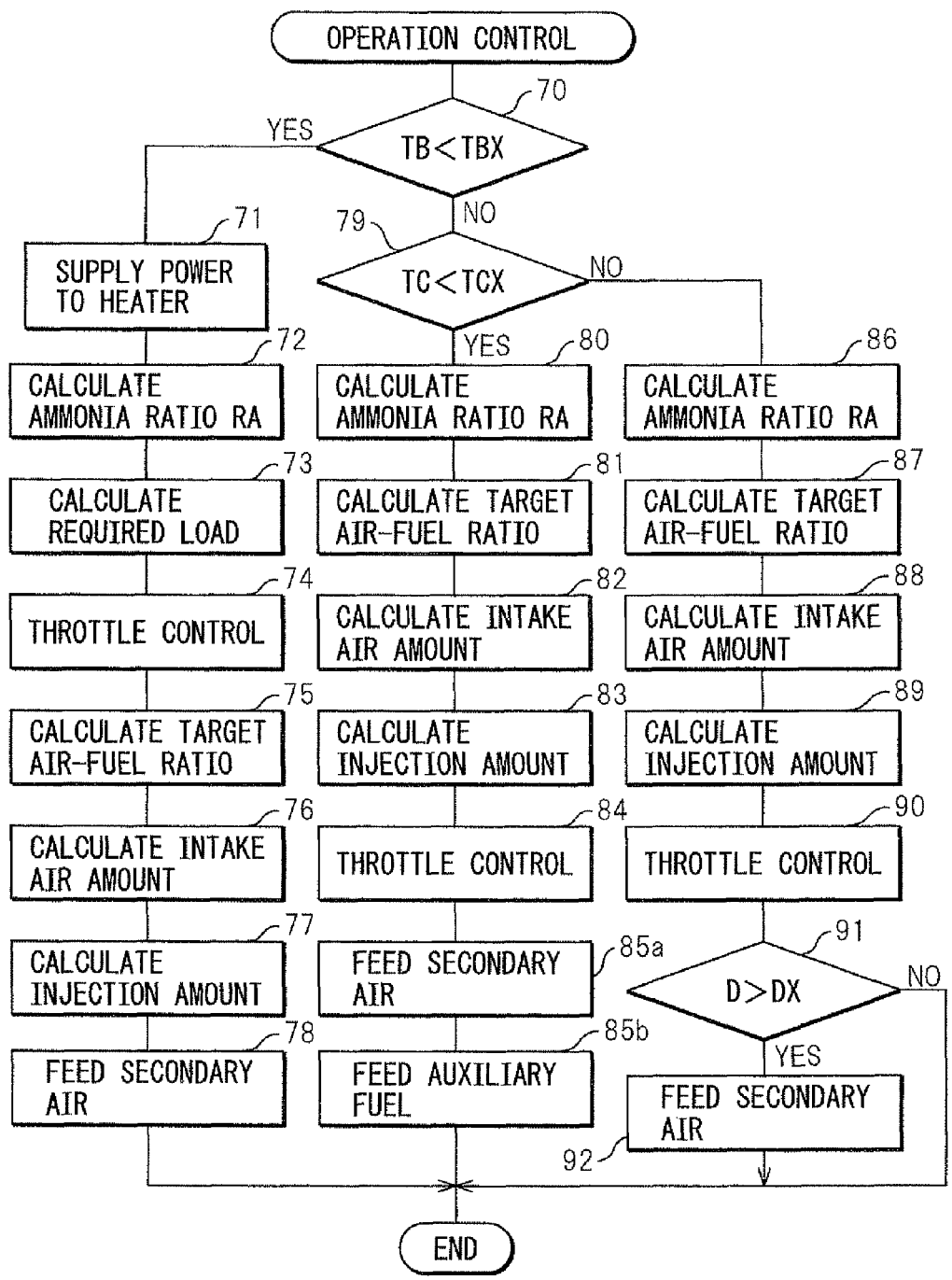
FIG. 7 is a flow chart for operational control.

FIG. 7 shows an operational control routine for executing this third embodiment. Step 70 to step 90 in the operational control routine shown in FIG. 7 are exactly the same as step 70 to step 90 in the operational control routine shown in FIG. 6. The difference between the routine shown in FIG. 7 and the routine shown in FIG. 6 resides only in that two steps 90 and 91 are added after step 90 in FIG. 7.

Namely, in the routine shown in FIG. 7, it is determined at step 91 whether a concentration D of ammonia exhausted from the combustion chamber 5 is higher than a predetermined allowable concentration DX. When D>DX, the routine proceeds to step 91 where the secondary air is fed from the secondary air feed valve 38.

Next, a fourth embodiment will be explained. In this fourth embodiment, when the temperature TC of the exhaust purification catalyst 19 exceeds a predetermined limit temperature Tmax, the air-fuel ratio is made rich in order to prevent thermal degradation of the exhaust purification catalyst 19. When the air-fuel ratio is made rich, the unburned fuel amount in the combustion chamber 5 increases, and combustion heat is consumed in order to raise the temperature of the unburned fuel, therefore the exhaust gas temperature becomes low. Thus, thermal degradation of the exhaust purification catalyst 19 can be prevented. Note, when the air-fuel ratio is made rich, the amount of the unburned ammonia exhausted from the interior of the combustion chamber 5 increases, therefore the secondary air is fed into the engine exhaust passage in order to oxidize the unburned ammonia.

FIG. 8 shows an operational control routine for executing this fourth embodiment. Step 70 to step 90 in the operational control routine shown in FIG. 8 are exactly the same as step 70 to step 90 in the operational control routine shown in FIG. 6. The difference between the routine shown in FIG. 8 and the routine shown in FIG. 6 resides only in that three steps 93, 94, and 95 are added after step 90 in FIG. 8.

Namely, in the routine shown in FIG. 8, it is determined at step 93 whether the temperature TC of the exhaust purification catalyst 19 exceeds a predetermined limit temperature Tmax. When TC>Tmax, the routine proceeds to step 94 where the amount of ammonia injected from the ammonia injector 13 and the amount of the reformed gas injected from the reformed gas injector 36 are increased and the air-fuel ratio is made rich. Next, at step 95, the secondary air is fed from the secondary air feed valve 38.

While the invention has been described with reference to specific embodiments chosen for purpose of illustration, it should be apparent that numerous modifications could be made thereto by those skilled in the art without departing from the basic concept and scope of the invention.

The invention claimed is:

1. An ammonia burning internal combustion engine using ammonia as fuel, comprising:
    a combustion chamber;
    an exhaust passage;
    an injector for feeding the ammonia into the combustion chamber;
    a reformer reforming the ammonia and producing a reformed gas containing hydrogen therein, the reformed gas being fed into the combustion chamber in addition to the ammonia, a ratio of an amount of the ammonia fed to a total amount of fuel fed being defined as an ammonia ratio,
    an exhaust purification catalyst arranged in the exhaust passage;
    a secondary air feeding device arranged in the exhaust passage upstream of the exhaust purification catalyst to feed a secondary air into the exhaust passage upstream of the exhaust purification catalyst;
    a memory for storing the ammonia ratio after completion of engine warmup as a set ammonia ratio, the set ammonia ratio being set in advance in accordance with an operating state of the engine; and
    a control unit configured to control the ammonia ratio and a supply of the secondary air in accordance with a reforming ability of the reformer so as to increase the ammonia ratio over the set ammonia ratio and cause the secondary air to feed from the secondary air feeding device when the reforming ability is less than a predetermined reforming ability.

2. The ammonia burning internal combustion engine as claimed in claim 1, wherein the ammonia ratio after the completion of engine warmup is set in advance as a function of an engine load and an engine speed.

3. The ammonia burning internal combustion engine as claimed in claim 1, wherein when the reforming ability of the reformer is a predetermined reforming ability or less, an engine load is increased and the ammonia feed amount is increased.

4. The ammonia burning internal combustion engine as claimed in claim 1, wherein when the reforming ability of the reformer is the predetermined reforming ability or less, an air-fuel ratio is made rich.

5. The ammonia burning internal combustion engine as claimed in claim 1, wherein an air-fuel ratio is made lean and an auxiliary fuel is fed into the engine exhaust passage upstream of the exhaust purification catalyst until the exhaust purification catalyst is activated when the reforming ability of the reformer becomes the predetermined reforming ability or more.

6. The ammonia burning internal combustion engine as claimed in claim 1, wherein the secondary air and an auxiliary fuel are fed into the engine exhaust passage upstream of the exhaust purification catalyst until the exhaust purification catalyst is activated when the reforming ability of the reformer becomes the predetermined reforming ability or more.

7. The ammonia burning internal combustion engine as claimed in claim 1, wherein a concentration of ammonia in the exhaust gas exhausted from the combustion chamber is detected, and the secondary air is fed into the engine exhaust passage when the ammonia concentration exceeds a predetermined allowable concentration.

8. The ammonia burning internal combustion engine as claimed in claim 1, wherein when a temperature of the exhaust purification catalyst exceeds a predetermined limit temperature, an air-fuel ratio is made rich and the secondary air is fed into the engine exhaust passage.

* * * * *